United States Patent [19]

Allsop et al.

[11] Patent Number: 5,330,312

[45] Date of Patent: Jul. 19, 1994

[54] SKI RACK ATTACHMENT FOR A VEHICLE-MOUNTED RACK

[75] Inventors: Ivor J. Allsop, Bellingham; Eivind Clausen, Bellingham, both of Wash.

[73] Assignee: Allsop, Inc., Bellingham, Wash.

[21] Appl. No.: 979,800

[22] Filed: Nov. 20, 1992

Related U.S. Application Data

[60] Division of Ser. No. 587,061, Sep. 26, 1990, Pat. No. 5,181,822, which is a continuation-in-part of Ser. No. 397,693, Aug. 23, 1989, abandoned.

[51] Int. Cl.⁵ ............................................. B60R 9/00
[52] U.S. Cl. ......................... 414/462; 224/42.03 R; 224/42.08; 224/917
[58] Field of Search ............ 224/42.03 B, 42.03 R, 224/42.08, 42.44, 315, 319, 321, 324, 325, 917; 280/513; 414/462, 465, 466, 482, 483, 546, 743, 917

[56] References Cited

U.S. PATENT DOCUMENTS

| | | | |
|---|---|---|---|
| 2,605,115 | 7/1952 | Smith | 280/513 |
| 3,606,111 | 9/1971 | Gjesdahl | 224/917 X |
| 3,712,522 | 1/1973 | Penniman | 224/917 X |
| 3,757,975 | 9/1973 | Sneider | 214/450 |
| 3,854,641 | 12/1974 | Kohls | 224/917 X |
| 4,050,616 | 9/1977 | Mosow | 224/42 |
| 4,078,708 | 3/1978 | Mayer | 224/917 X |
| 4,089,448 | 5/1978 | Traeger | 224/42 |
| 4,336,897 | 6/1982 | Luck | 224/42 |
| 4,400,129 | 8/1983 | Eisenberg et al. | 414/462 |
| 4,403,716 | 9/1983 | Carlson et al. | 224/42 |
| 4,456,421 | 6/1984 | Robson | 414/546 |
| 4,461,410 | 7/1984 | Tartaglia | 224/42 |
| 4,461,413 | 7/1984 | Hoerner | 224/311 |
| 4,573,855 | 3/1986 | Braswell | 414/463 |
| 4,635,835 | 1/1987 | Cole | 224/42 |
| 4,640,658 | 2/1987 | Webb, Jr. | 414/462 |
| 4,673,328 | 6/1987 | Shiels | 414/471 |
| 4,676,414 | 6/1987 | Deguevara | 224/42 |
| 4,813,584 | 3/1989 | Wiley | 224/42.4 |
| 4,826,387 | 5/1989 | Audet | 414/462 |

Primary Examiner—Michael S. Huppert
Assistant Examiner—Janice Krizek
Attorney, Agent, or Firm—Christensen, O'Connor, Johnson & Kindness

[57] ABSTRACT

A ski rack (120) for attachment to an articulated support rack (10) is disclosed. The ski rack includes a vertically oriented mainframe (124) to which a set of mounting arms (132) is attached for securing the ski rack to frame members (30, 32) integral with the support rack. A support frame (126) is secured to the top of the mainframe; a locking frame (130) is secured to the bottom of the mainframe. Skis are placed in a support rack in vertical orientation such that the top clips of the skis are suspended by the support frame. The tail ends of the skis are disposed inside the locking frame (130) to prevent the skis from swaying. The mounting arms, the support frame, and the locking frame are all hingedly secured to the mainframe so that when the ski rack is not used it may be folded flat for storage.

11 Claims, 13 Drawing Sheets

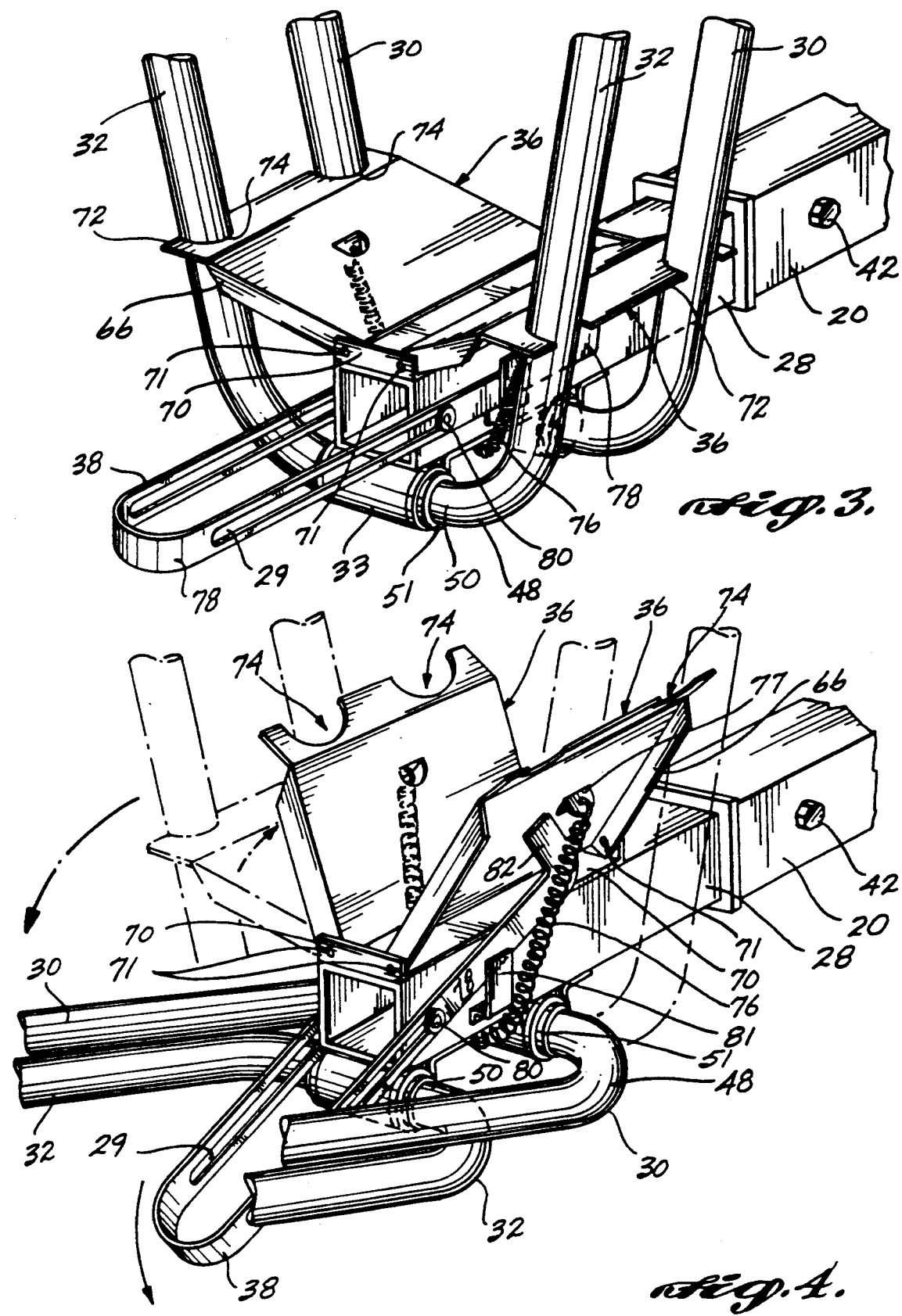

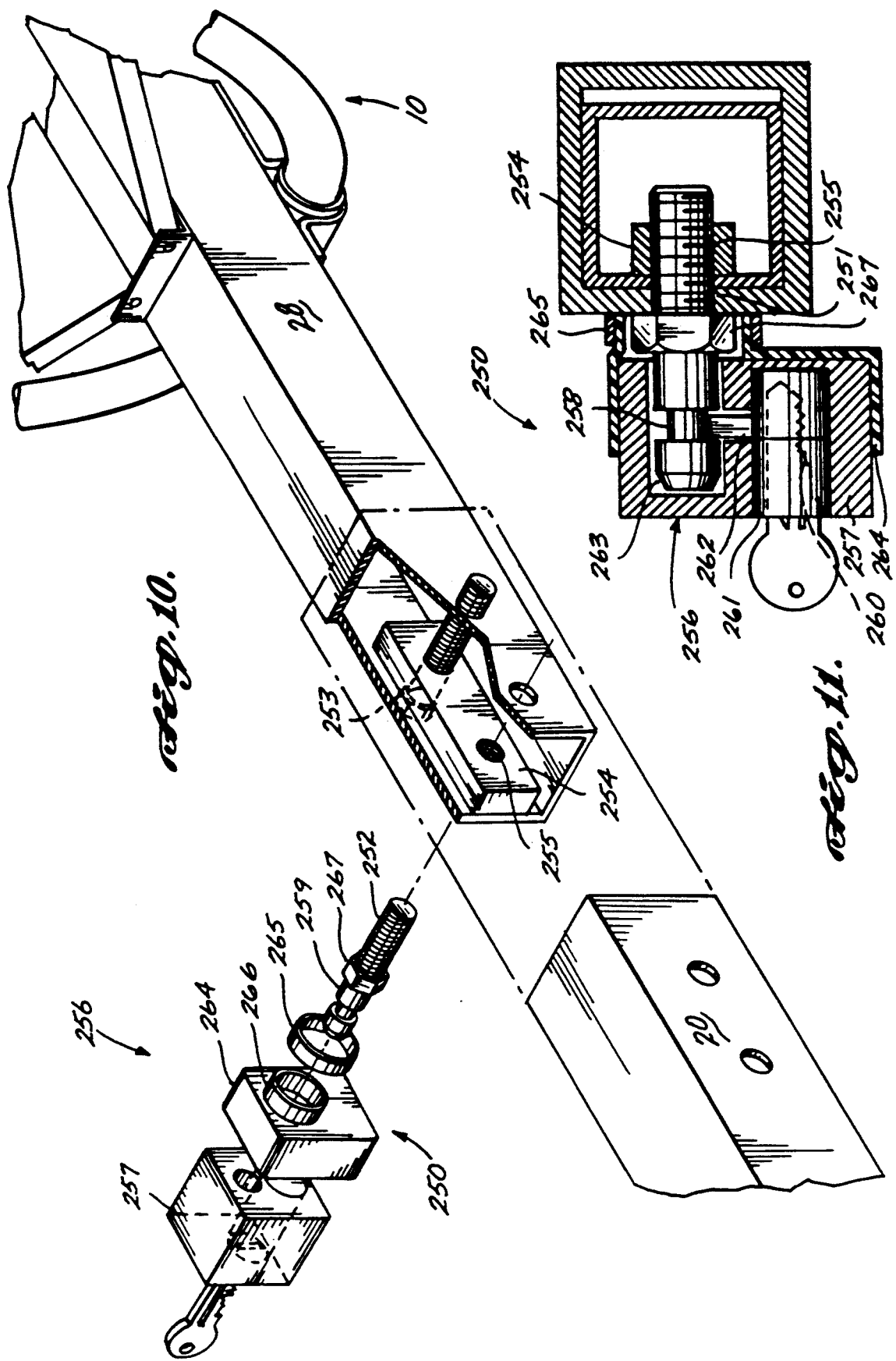

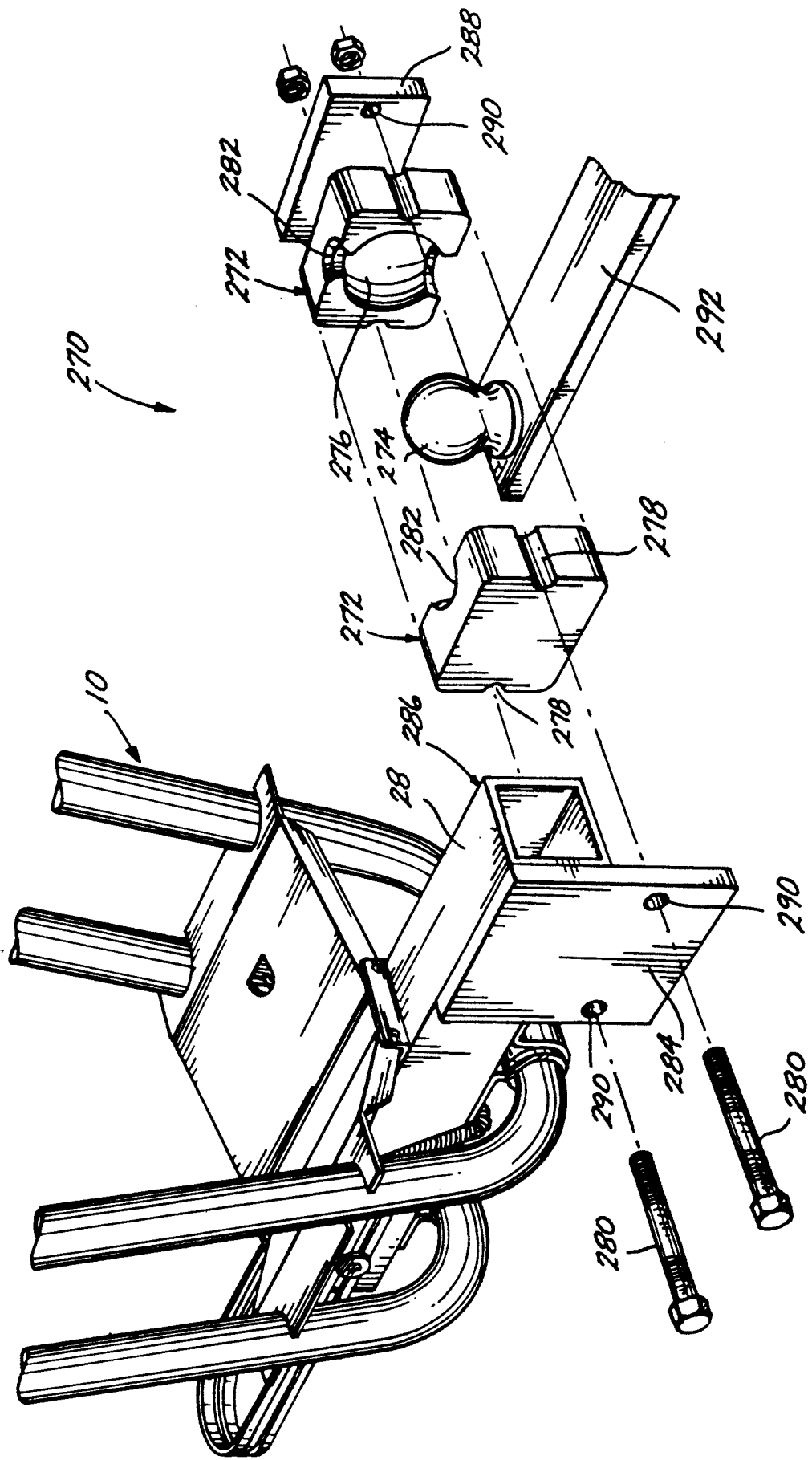

SKI RACK ATTACHMENT FOR A VEHICLE-MOUNTED RACK

This application is a divisional of application Ser. No. 07/587,061 filed Sep. 26, 1990, now U.S. Pat. No. 5,181,822, which is a continuation-in-part of application Ser. No. 07/397,693, filed Aug. 23, 1989, now abandoned.

TECHNICAL FIELD

The present invention pertains to support frames for supporting objects on the exterior of motor vehicles, and, more particularly, to a folding support rack that is attachable to vehicle trailer hitches.

BACKGROUND OF THE INVENTION

Support racks are typically mounted on the exterior of a motor vehicle to support bicycles, minibikes, skis, surfboards, and the like, above the ground. These racks are constructed of rigid frame members having arms extending horizontally therefrom for supporting objects, and they are usually mounted on the rear bumper of the vehicle, or on the trunk lid, or a combination of both.

While these support racks have been adequate for their purposes, they have several drawbacks. Because these racks are fixedly mounted on the rear of the vehicle, they restrict access to vehicles having rearward-opening doors, such as vans, pickup trucks, campers, and the like. In addition, heavy lifting is frequently required to place objects on and remove them from the support arms. Furthermore, these racks frequently obstruct the view of the rear license plate, which is a violation of motor vehicle laws.

Several devices have been proposed for overcoming these disadvantages. For instance, U.S. Patent No. 4,400,129, issued to Eisenberg et al. on Aug. 23, 1983, discloses a pair of horizontally projecting arms mounted to the crossmember of a T-shaped support member that in turn is pivotally mounted to a vehicle. A substantial drawback to this device is that, as the T-shaped support member is pivoted downward, the pair of arms angle downward, allowing an object supported thereon to slide off. Even if the object were firmly fastened to the support member, it would not be held in an upright position as the support arm is pivoted downward. In addition, the vertical support post obstructs the view of the license plate when mounted on the rear of a vehicle. In U.S. Pat. No. 4,635,835, issued to Cole on Jan. 13, 1987, a carrier apparatus for an all-terrain vehicle is disclosed having a frame pivotally mounted to a horizontal beam that is attached to a trailer hitch. An all-terrain vehicle is mounted to the frame and supported in a vertical position for transportation and then lowered to a horizontal position for loading and unloading. An obvious drawback to this device is that vertically positioning the all-terrain vehicle, or any motorized vehicle, for that matter, can easily cause fuel, oil, and cooling liquids to drain from the engine, creating a fire hazard and the potential for damage and injury. In addition, the rigidly mounted support arms will not hold a bicycle or motorcycle in an upright orientation as the carrier apparatus is pivoted between the vertical and horizontal orientations. Furthermore, it is impossible to see the license plate when this device is in use.

Consequently, there is a need for a support rack that can mount to the rear of a vehicle and that not only allows access to the rear doors of the vehicle without requiring removal of the supported objects and the support frame, but also maintains the objects in an upright position as the frame pivots between a horizontal or lowered position, with the object on or close to the ground, and a vertical or raised position, with the object supported above the ground. Also, it is important that the rack provide an unrestricted view of the rear license plate when in use.

SUMMARY OF THE INVENTION

The present invention is directed to an articulated support rack for motor vehicles. The rack comprises a base member for releasably attaching the rack to a vehicle, a frame pivotally mounted on the base member, at least one support arm mounted on the frame to extend horizontally therefrom and remain substantially horizontal as the frame pivots, and a releasable lock for holding the frame in a substantially upright position.

In accordance with another aspect of the present invention, the base member includes a tongue that is slidably receivable within a trailer hitch sleeve mounted on the vehicle. Although the present invention is made with a square tongue that is designed to fit into a square hitch receptacle, it does not exclude other forms of attachments, such as to the bumper of a vehicle, the trailer hitch ball, or by the use of the hole that the ball is mounted in.

In accordance with another aspect of the present invention, the frame comprises a pair of tubular frame members mounted in spaced parallel relationship on the base member to jointly pivot between a raised, substantially upright position and a lowered, substantially horizontal position.

In accordance with yet another aspect of the present invention, each support arm has a distal end that projects away from the vehicle and a proximal end pivotally mounted to a first frame member that is nearest to the vehicle, each support arm being further releasably attached to a second frame member that is farthest from the vehicle such that, when the support arm is released from the second frame member, the support arm pivots between a deployed configuration, wherein the support arm bears against the second frame member in a horizontal position, and a stored configuration, wherein each support arm is pivoted about the first frame member to lie in substantially the same plane as the first frame member.

In accordance with still yet another aspect of the present invention, the releasable lock comprises a pair of plates pivotally mounted on the base member and biased into engagement with each frame member to hold each frame member in a raised position. Preferably, each pair of plates is pivotally mounted on the base member and has an outer edge that is notched to engage and hold a frame member. Biasing means urge the pair of plates into engagement with the frame members when the frame members are in the raised position.

In accordance with yet a further aspect of the present invention, the rack includes a lever pivotally mounted on the base member having a first end protruding therefrom and a second end bearing against the pair of plates such that selected movement of the first end of the lever in a predetermined direction causes the second end to move the pair of plates out of engagement with the frame members and permit movement of the frame members.

In accordance with yet another aspect of the present invention, the pair of frame members are each triangularly shaped and have a corner pivotally mounted on the base member, with the pair of frame members being mounted in spaced parallel relationship to each other. Preferably, the triangularly shaped frame members are formed of tubular metal and sized to permit unobstructed viewing of a license plate on the vehicle when the pair of triangularly shaped members are in the raised position.

In accordance with still another feature of the present invention, a ski rack adapted to hold several sets of skis can be substituted for the support arms. The ski rack includes a vertically oriented main frame that is attached to the pivoting frame members by a pair of mounting arms. The ski rack further includes a horizontally oriented ski rest in which the center of the skis are locked. The ski rack also includes a base rest in which the tail ends of the skis are inserted.

In accordance with an alternative aspect of the present invention, the releasable lock comprises a brace that is attached to the frame members and releasably engaged with the base member.

As will be readily appreciated from the foregoing description, the present invention provides a unique support rack that easily mounts to existing trailer hitch sleeves, thus eliminating the need for attachment to a vehicle bumper. The rack not only pivots away frown the vehicle to allow unrestricted access to the vehicle interior through the doors at the rear of the vehicle, but also maintains the bicycles, skis, etc. in an upright position as the rack pivots. This provides for easy loading of the objects onto the rack and unloading of objects from the rack and maintains a substantially clear space around the rear of the vehicle when the rack is pivoted away from the vehicle. In addition, spillage of fuel and other liquids from motorcycles is avoided. The triangularly shaped frame members provide unobstructed viewing of the rear license plate, and they provide an attachment point for securing a bicycle to the rack to hold it steady for maintenance and repairs. The unique release lever permits a user to use a simple downward pushing motion with the foot to release the lock plates and allow the frame to pivot. In addition, the lever is mounted to slide in along the base member to store out of the way.

BRIEF DESCRIPTION OF THE DRAWINGS

The foregoing and other features and advantages of the present invention will be more readily appreciated as the stone becomes better understood from the detailed description when considered in conjunction with the following drawings, wherein:

FIG. 3 is an enlarged isometric view of the locking plates and the release lever in the locked position;

FIG. 4 is an enlarged isometric view showing the release lever depressed and the locking plates disengaged from the frame;

FIG. 10 is a perspective view of an alternative embodiment of the base member tongue portion of the articulated support rack of this invention;

FIG. 11 is a cross sectional view of how the alternative base member tongue portion of FIG. 10 is used to secure the articulated support rack to a sleeve-type trailer hitch;

FIG. 12 is an exploded view of a trailer hitch coupling assembly for attaching the articulated support rack of this invention to a ball-type trailer hitch;

DETAILED DESCRIPTION OF THE PREFERRED EMBODIMENT

Figure 1:
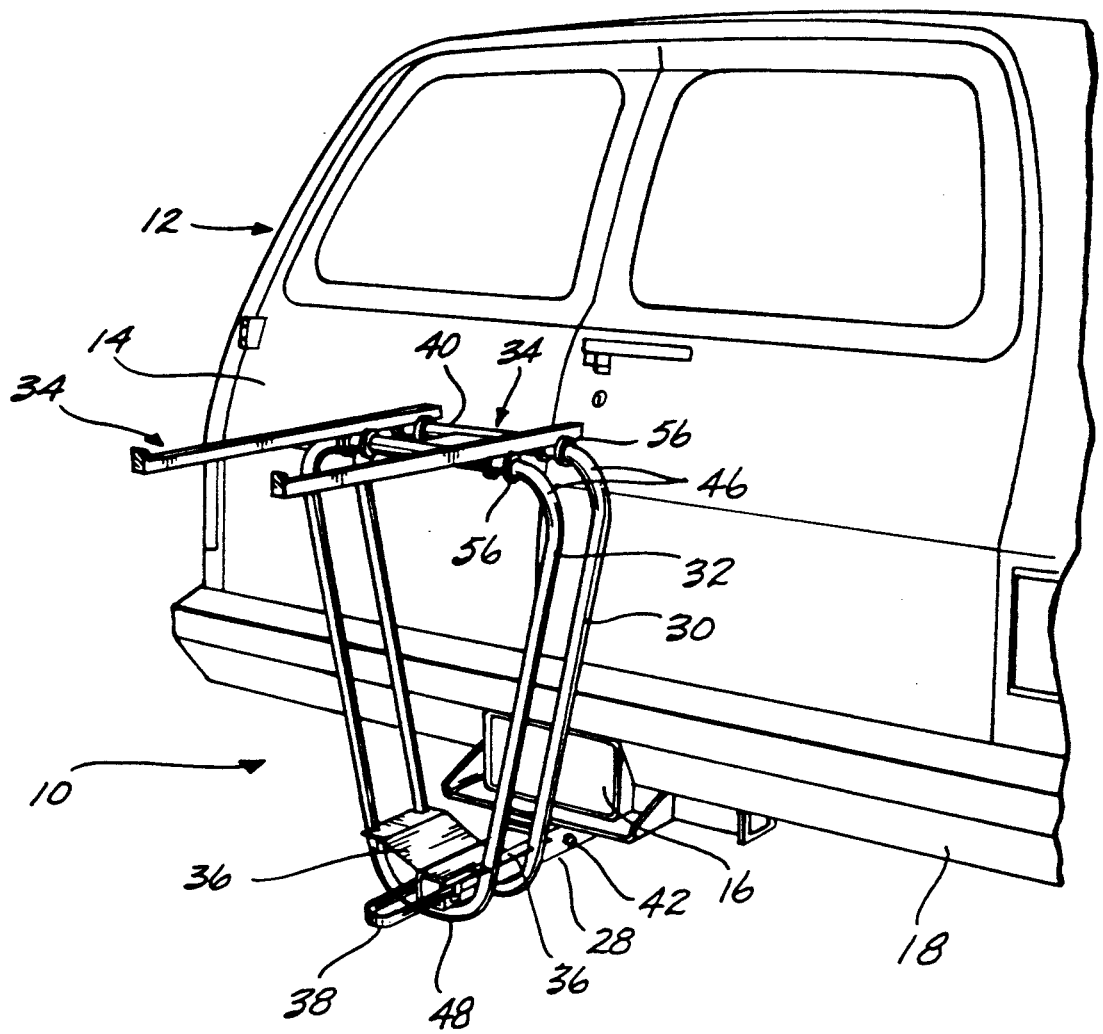
FIGURE 1 is an isometric view of the articulated support rack mounted on the rear of a van.
Figure 2:
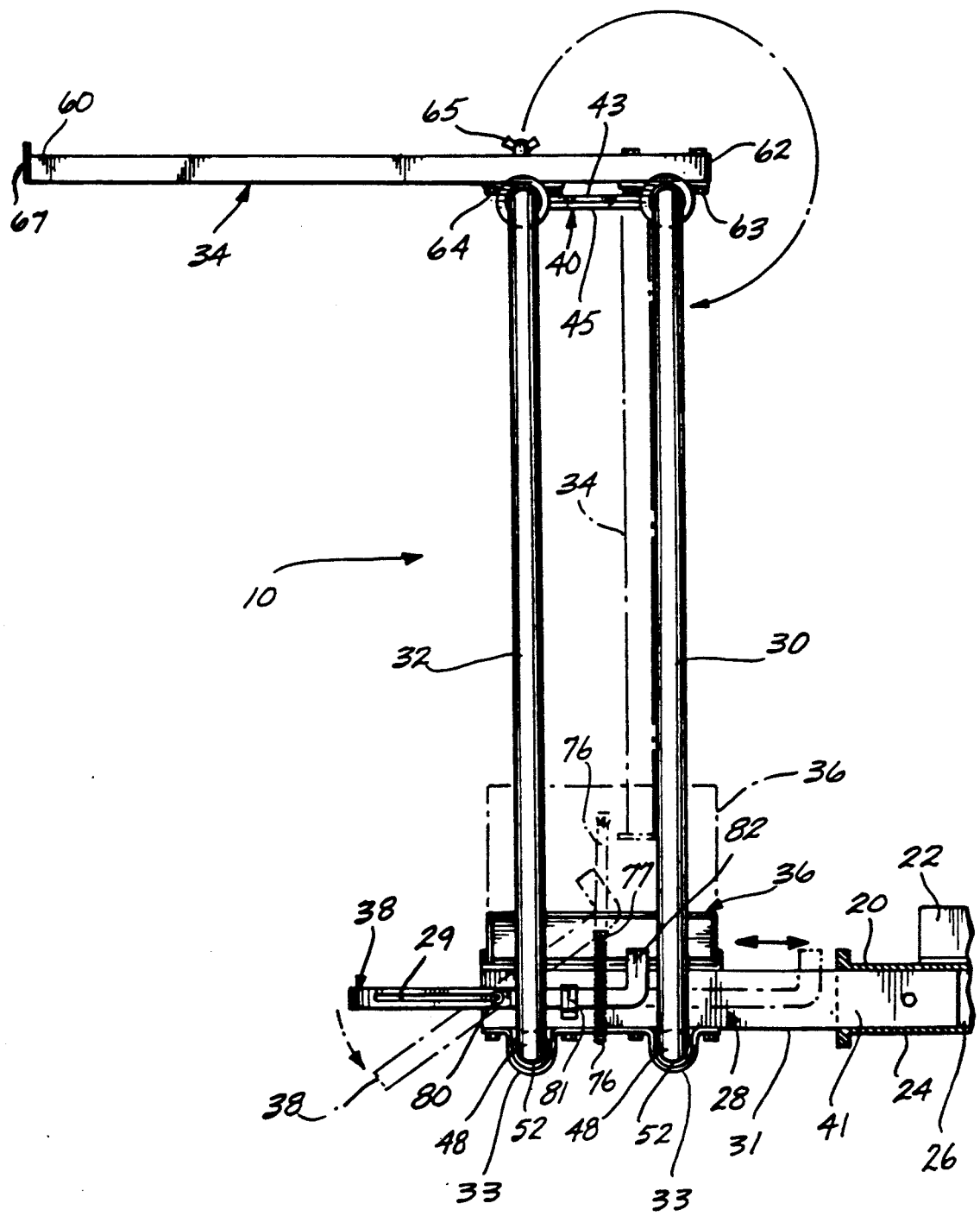
FIG. 2 is a side view of the articulated support rack of FIG. 1, showing in partial cross section the engagement of the rack with a trailer hitch sleeve.

Referring initially to FIGS. 1 and 2, a representative embodiment of the support rack 10 formed in accordance with the present invention is shown attached to a vehicle 12, and, more particularly, to a van-type vehicle having rearward-opening doors 14. A license plate 16 is mounted on a bumper 18 at the rear of the vehicle 12. A trailer hitch sleeve 20 is attached to a frame rail 22 underneath the back of the vehicle 12. The trailer hitch sleeve 20, as well known in the art, is formed from planar walls 24 that define a longitudinal axial cavity 26 of square or rectangular cross section.

The support rack 10 is comprised generally of a base member 28 extending longitudinally relative to the vehicle 12; a first arcuate support frame member 30 mounted on the base member 28 and positioned nearest to the vehicle 12; a second arcuate support frame member 32 pivotally mounted on the base member 28 and positioned in spaced parallel relationship to the first frame member 30 to be farthest from the vehicle 12; a pair of rearwardly extending arms 34 mounted to the tops of the support frame members 30 and 32; a pair of releasable lock plates 36 mounted on the top of and extending along the base member 28; and a release lever 38 mounted on the base member 28 beneath the lock plates 36. A crossmember 40 extends horizontally between the arms 34 to connect the upper ends of the first frame member 30 and the second frame member 32.

Figure 2A:
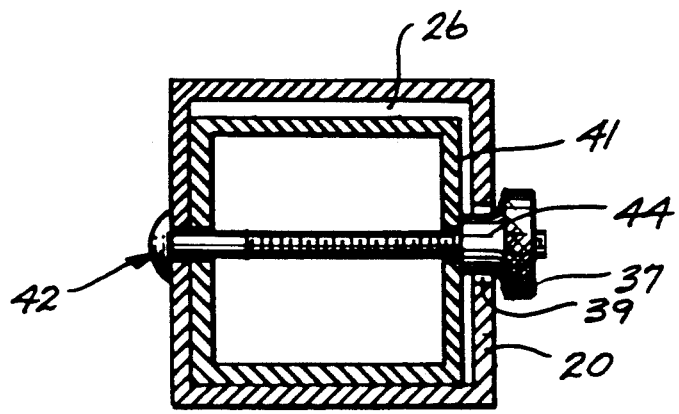
FIG. 2a is a cross sectional view of the trailer hitch sleeve frame base member interface as viewed along line 2a—2a in FIG. 2.

As shown more clearly in FIGS. 2 and 2a, the base member 28 is formed of a hollow pipe or tube having a generally square or rectangular cross-sectional shape. The base member 28 has a forward tongue portion 41 that is sized and shaped to be slidably received within the cavity 26 of the trailer hitch sleeve 20. The base member tongue portion 41 has an outer cross sectional profile that is smaller than the profile of the trailer hitch cavity to facilitate the rapid installation and removal of the support rack 10. A threaded cross-bolt 42 projects transversely through the trailer hitch sleeve 20 and the tongue portion 41 to lock the base member 28 in engagement with the sleeve 20. The cross-bolt 42 is held in place by a nut 37 with an inner shoulder 44 that passes through a bore 39 formed in the trailer hitch sleeve 20. The nut inner shoulder 44 abuts against the base member tongue portion 41 to urge the tongue portion against the inner wall of the hitch sleeve 20. This reduces the vibrations of the support rack 10 and helps prevent the cross-bolt from loosening when the vehicle is in motion.

The first and second frame members 30 and 32 preferably are composed of tubular metal and formed to assume a triangular shape with rounded corners 46 at the top. The bottom corner or apex 48 of the frame members has a straight portion 50 that is pivotally mounted within a tubular sleeve 51 affixed transversely to the bottom face 31 of the base member 28 by a sleeve bracket 33. The first and second frame members 30 and 32, respectively, are further each formed with a top rail 54 that is separated into two spaced apart sections, one integral with each rounded comer 46.

Figure 2B:
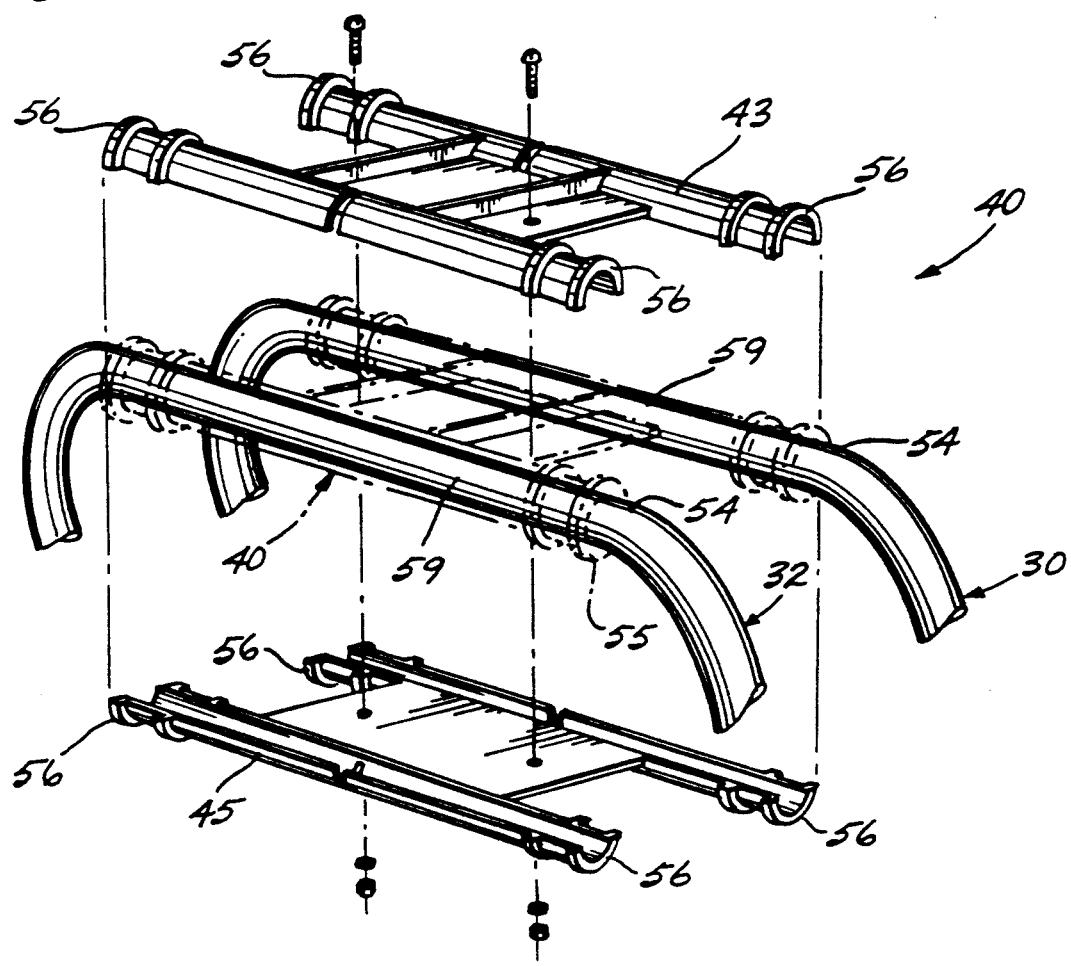
FIG. 2b is an exploded view of the cross member used to secure the support frame members of FIG. 2 together.

The crossmember 40, shown more clearly in FIG. 2b, is formed from two identical pieces of molded plastic, a top half 43 and a bottom half 45, that are held together with suitable fasteners 49. The crossmember 40 is pivotally secured to the frame members 30 and 32 by bushings 55 that are from out of semi-circular sections 56 that are integrally molded as part of the crossmember pieces 43 and 45. The bushings 55 are each formed with a pair of spaced apart lips 57 that define a saddle space 58. Pipes 59 of smaller diameter than the frame members 30 and 32 connect the top rails 54 of each frame member together. The crossmember 40 rigidly holds the first and second frame members 30 and 32 in spaced parallel relationship, while allowing the frame members 30 and 32 to pivot as they move between a raised position and a lowered position, as will be described in more detail below.

The pair of arms 34 have distal, rearward ends 60 that project away from the vehicle 12 and proximal, forward ends 62 that are pivotally mounted to the first frame member 30 by a clamp 63. Releasable threaded fasteners 61 secure the arms 34 and clamps 63 together. Each arm 34 is constructed of tubular metal having a generally square cross-sectional shape. With the forward, proximal end 62 of each arm 34 pivotally mounted to the first frame member 30, each arm 34 can pivot clockwise when the frame members 30 and 32 are in the lowered, horizontal position, as shown in dotted line in FIG. 2, to a stored configuration wherein each arm 34 lies adjacent a to the first frame member 30. When the arm 34 is swung counterclockwise, it will contact the top rail 54 of second frame member 32 when it is in a horizontal position or a deployed configuration. A clamp 64 and releasable fastener 65 positioned around the crossmember 40 on each top rail 54 retains each arm 34 in engagement with the second frame member 32 while permitting limited movement of the second support frame member 32 with respect to each arm 34. A stop plate 67 is attached of over the free end of each arm rearward end 60 in order to block rearward movement of bicycles placed on the arms 34.

Referring next to FIG. 3, the mounting and operation of the releasable lock plates 36 will now be described. Each lock plate 36 has folded-over sides 66 pivotally mounted at one end to the top surface 68 of the base member 28 by a bracket 70 and hinge pins 71. The outside edge 72 of each lock plate 36 has two notches 74 formed thereon that are sized to fairly closely engage the first and second support frame members 30 and 32 when they are in a substantially raised or vertical position, as shown in FIG. 3. A helical extension spring 76 is attached at one end to the base member 28 and at the other end to a tab 77 on each lock plate 36 to resiliently urge the lock plates 36 into engagement with the first and second frame members 30 and 32. The four notches 74 provide substantially positive locking engagement with the frame members 30 and 32, and appreciable movement of the frame members 30 and 32 can take place only when the lock plates are released.

In order to release the lock plates 36 from engagement with the support frame members 30 and 32, the lock plates 36 must be pivoted upwardly away from the frame members 30 and 32 about their hinges 70. One method for doing this is with the use of the release lever 38. As shown in FIGS. 3 and 4, the release lever 38 is generally U-shaped and is slidably mounted to the base member 28 by pins 80 that extend through elongated slots 29 formed in each side of the lever 38 and by brackets 81 on each side thereof to position the free ends 78 of the lever 38 under a corresponding lock plate 36. As shown in FIG. 3, the release lever 38 is slidable along the base member 28 so that only a small portion protrudes rearwardly therefrom. In this stored configuration, the release lever is positioned to avoid interference with bicycles or other objects supported on the rack 10. In a deployed configuration, the release lever 38 is slid rearwardly relative to the base member 28 to provide a greater mechanical advantage, as shown in FIG. 4. A downward force applied to the release lever 38, such as from a foot, causes the release lever 38 to pivot on the pins 80. Fingers 82 projecting upward from the ends 78 of the release lever 38 are moved upwardly into contact against the underside of the lock plates 36 to pivot the lock plates 36 upwardly about their hinges 71 and disengage from the first and second frame members 30 and 32. The first and second frame members 30 and 32 may then be moved frown the substantially raised position to a lowered position.

Figure 5:
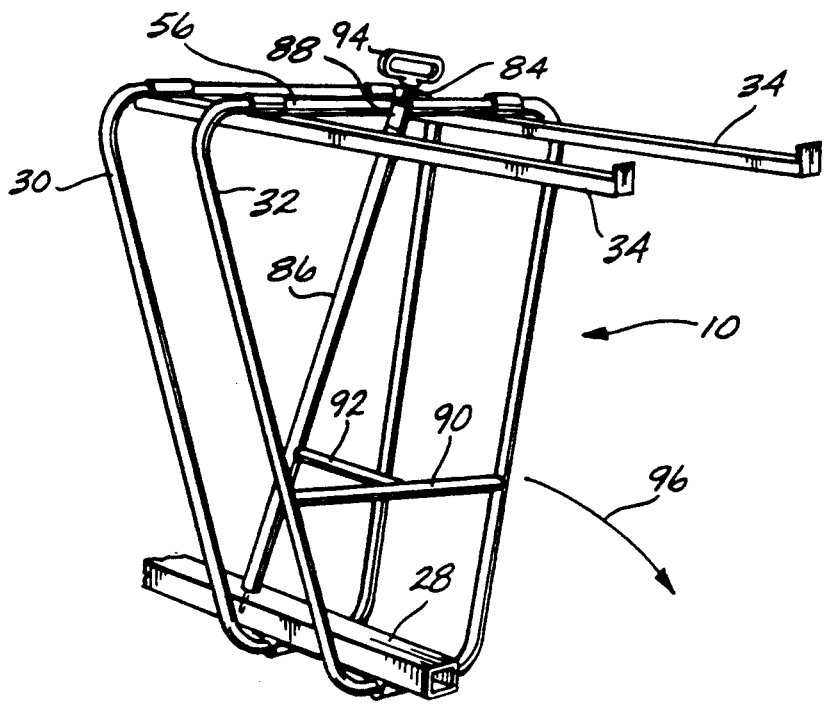
FIG. 5 is an isometric view of an alternative embodiment of a releasable lock in the form of a slidable locking rod.

Other methods may be used for locating the first and second support frame members 30 and 32 in the upright position. For instance, in FIG. 5, the first find second support frame members 30 and 32 are locked in the upright position by rod 84 that is slidably engaged within a tube 86. The tube 86 extends diagonally upward and rearward from an elevation slightly above the base member 28 with the upper end 88 of the tube 86 fixedly attached to the top rail 54 of the second frame member 32. A lower cross-bar 90 formed on the second frame member 32 has a rearward horizontal leg 92 that is attached to an intermediate portion of the tube 86 to rigidly hold the tube 86 in position. The rod 84 has a handle 94 at its upper end, with the lower end projecting into an opening (not shown) foraged in the base member 28. To release the first and second frame members 30 and 32 from the upright positions, the handle 94 is used to pull the rod 84 upward and out of engagement with the base member 28. The support frame members 30 and 32 can then be pivoted outward and downward as represented by arrow 96.

Figure 6:
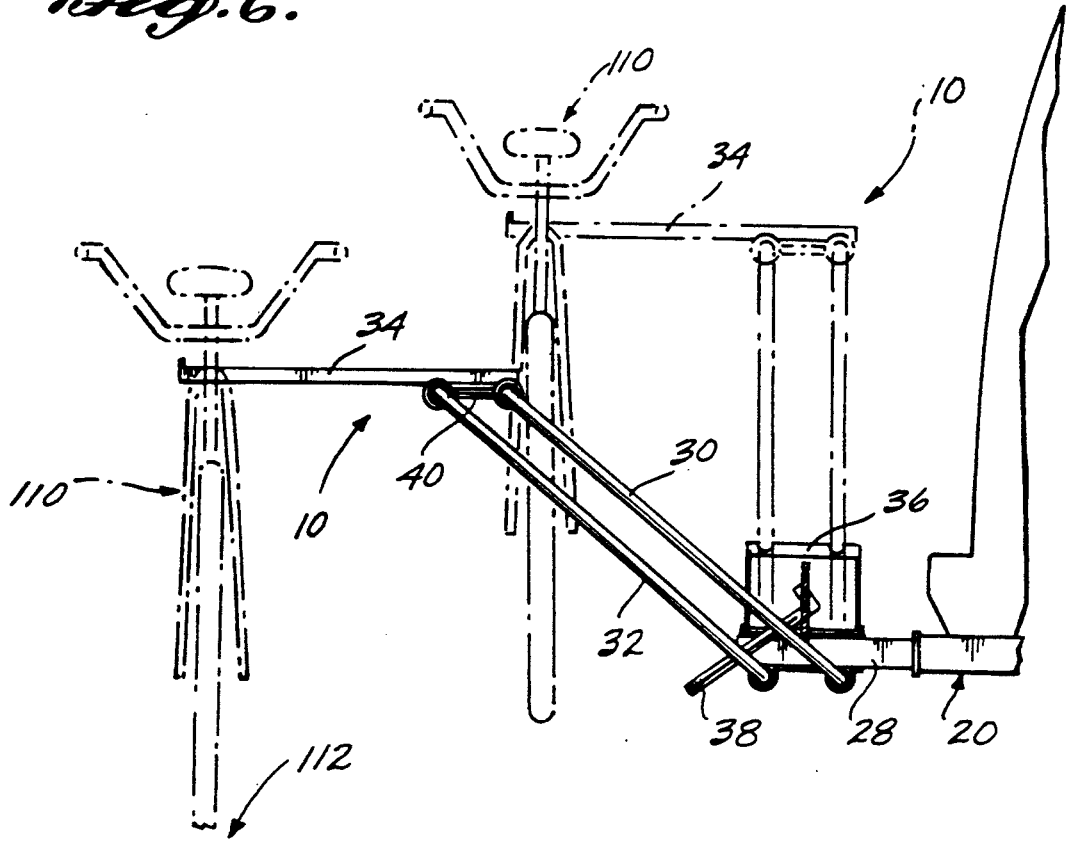
FIG. 6 is a side view of the articulated support rack in the upright and horizontal positions.

The operation of the support rack 10 will now be described in conjunction with FIG. 6. Initially, the support rack 10 is mounted to the trailer hitch sleeve 20 by inserting the tongue portion 41 of the base member 28 into the cavity 26 of the sleeve 20. The bolt 42 is then engaged through aligned cross holes formed in the sleeve 20 and the tongue portion 41 to firmly lock the base member 28 in engagement with the hitch sleeve 20.

For purposes of description, a bicycle 110 is illustrated in an upright position on the ground 112. The first and second frame members 30 and 32 are pivoted counterclockwise to move away from the vehicle 12 and lower the pair of arms 34 to a level that allows the bicycle 110 to be slid or leaned onto the pair of arms 34. Because the frame members 30 and 32 are held in parallel relationship as they pivot, the pair of arms 34 will remain in a substantially horizontal position through the full range of motion of the frame members 30 and 32. The frame members 30 and 32, arms 34, and base member 28 cooperatively form a parallel, four-bar link arrangement.

After the bicycle 110 is placed on the arms 34, the first and second frame members 30 and 32 are pivoted clockwise toward the vehicle 12 to raise the bicycle 110 off the ground 112. The first and second frame members 30 and 32 (continue to rotate in a clockwise direction, as shown in FIG. 6, until they (engage the notches 74 on the lock plates 36, which prevent further rotation or movement of the first and second frame members 30 and 32 in either direction in the vertical plane. To release the first and second frame members 30 and 32, the release lever 38 is pulled out, and a downward force is applied thereon to urge the fingers 82 to contact and move the lock plates 36 upward and out of engagement with the first and second frame members 30 and 32. The first and second frame members 30 and 32 may then be pivoted downwardly away from the vehicle 12 to load or unload the bicycle 110 and provide access to the interior of the vehicle 12 I- through the rear doors 14.

Figure 7:
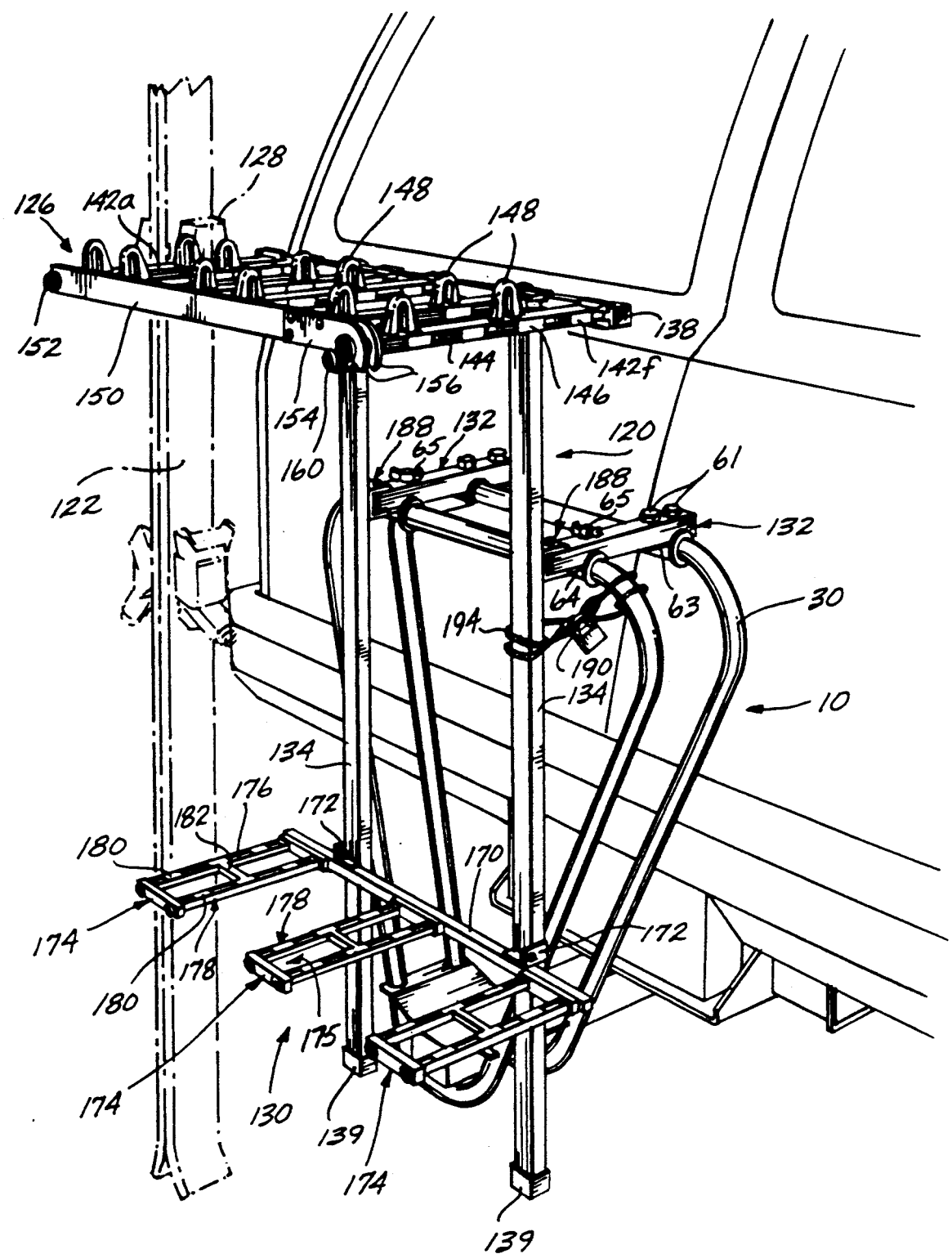
FIG. 7 is an isometric view of a ski rack mounted to the articulated support frame of this invention.

FIG. 7 depicts the support rack 10 with a ski rack 120 for carrying several pairs of skis 122. The ski rack 120 includes a vertically oriented main frame 124 with a horizontally oriented support frame 126 attached thereto from which the skis 122 are suspended by their toe clips 128. A locking frame 130 is attached to the main frame 124 below the support frame 126 to prevent the skis from swaying. The ski rack 120 also includes a pair of mounting arms 132 for attaching the ski rack to the first and second support frame members 30 and 32, respectively, in place of the rearward extending bicycle support arms 34 (FIG. 1).

Figure 8:
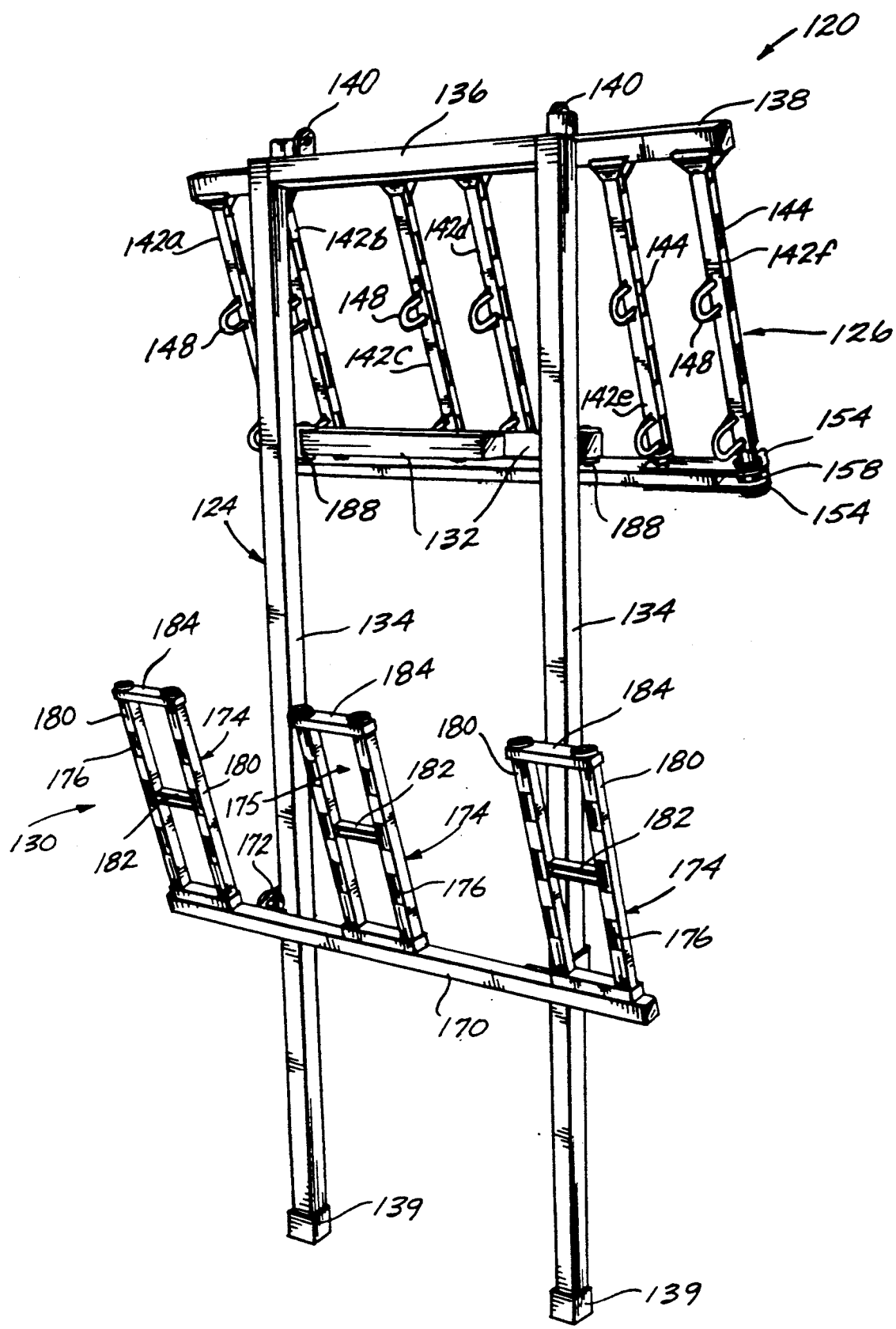
FIG. 8 is an isometric view of the ski rack of this position in its collapsed, or folded up, state.

As illustrated in FIGS. 7 and 8, the ski rack main frame 124 comprises a pair of parallel, spaced-apart vertical beams 134 that are connected at their top ends by a horizontally aligned cross beam 136, as depicted in FIG. 8. The bottom open ends of the vertical beams 134 are covered by protective plastic caps 139. The support frame 126 includes a first cross beam 138 that is located above and extends on either side of the main frame cross beam 136. The support frame first cross beam 138 is attached to the main frame 124 by a pair of hinge assemblies 140 that are also attached to the top ends of the main frame vertical beams 134. The hinge assemblies 140 allow the support frame 126 to be rotated about the top of the main frame 124 so that the support frame can be placed in a collapsed position wherein the free end of the frame is adjacent where the mounting arms are attached to the main frame.

Extending perpendicularly rearward from the support frame first cross beam 138 are a set of spaced-apart support arms 142a, 142b, 142c, 142d, 142e and 142f. The support arms are arranged in closely spaced pairs, 142a and 142b, 142c and 142d, and 142e and 142f. This arrangement allows pairs of skis to be placed together, bottom surface-to-bottom surface between each pair of support arms 142 such that downward movement of the skis will be limited by the skis' toe clips abutting the support arms. Each support arm 142 includes a metal rod 144 that is welded to the support frame first cross beam 138. Located over each metal rod 144 is a rectangular plastic sheath 146 that protects the skis from being dented or scratched by the metal rods. Integral with each sheath 146 are a pair of inverted-unshaped hooks 148. The hooks 148 are spaced from the support frame first cross beam 138 and each other a distance slightly greater than the widths of a ski 122. When the skis 122 are mounted in the support frame 126, a rope can be wound through the hooks 148 to secure the skis to the rack 120.

A support frame second cross beam 150 extends between the support arms 142a and 142f located at each end of the support frame 126. The support frame second cross beam 150 is rotatably attached to a mounting finger 152 that extends from the free end of end-located support arm 142a. The intermediately located support arms 142b, 142c, 142d and 142e are dimensioned so that their free ends are spaced a small distance away from the second cross beam 150. In one embodiment of the invention, support arms 142b, 142c, 142d and 142e are spaced approximately one-quarter inch from the second cross beam 150.

Attached to opposite sides of the free end of the support frame second cross beam 150 are a pair of locking plates 154. Each locking plate has a laterally extending, inverted-J-shaped extended section 156. The extended section 156 are normally positioned around a locking finger 158 that extends rearward from end support arm 142f. A lock 160 is mounted to a set of lock frames 162 integral with the locking plates 154 and spaced below the cross beam 150. The lock 160 has a rotating tongue (not illustrated) that can be set against the locking finger 158 to prevent the rotation of the support frame second cross beam 150.

The locking frame 130 is located approximately three-quarters of the distance between the top and bottom of the main frame 124. The locking frame 130 has a cross beam 170 that is attached to the main frame vertical beams 134 by a pair of hinge assemblies 172. The hinge assemblies 172 are attached to the top of the locking frame cross beam so that the locking frame 130 pan be rotated upwards against the vertical beams 134.

The locking frame 130 is provided with three tail frames 174 that each define a separate pair of tail openings 175 into which the tails of the skis are inserted to prevent them from swaying. The tail frames 174 are mounted perpendicularly to locking frame cross beam 170 and are aligned under the pairs of support arms 142a and 142b, 142c and 142d, and 142e and 142f between which the skis are inserted. Each tail frame 174 includes a pair of frame arms 176 which are metal rods that are mounted perpendicularly to the locking frame 130. Mounted over each pair of frame arms 176 is an H- shaped sheath 178 formed of reinforced plastic or other resilient material that will not scratch the skis 122. Each sheath has a pair of parallel spaced-apart elongated sections 180 that cover the frame arms 176. Each sheath 178 further has a, cross section 182 integral with the elongated sections 180 that bisects the tail opening 175 defined by the frame arms 176. A cross member 184, formed of reinforced plastic or other appropriate material is attached over the ends of each pair of frame arms 176. The cross members 184 are secured to the frame arms 176 by threaded fasteners or other appropriate means.

The locking frame cross beam 170, the frame arms 176,: the cross sections 182 and the cross member 184 define pairs of ski tail openings 175. When the ski boot portions of the skis 122 are placed between the support arms 142a, 142b, 142c, 142d, 142e and 142f, the tails of the skis are inserted in the ski tail openings 175. The surrounding ski enclosure prevents the skis from swaying when they are being transported.

The mounting arms 132 are each formed with openings (not illustrated) to facilitate securing the arms to the clamps 63 and 64 that are respectively integral with the first and second support frame members 30 and 32. Specifically, each mounting arm 132 has two sets of openings to accommodate threaded fasteners 61 that secure the arm to clamp 63. A single pair of openings is provided to accommodate the threaded fastener 65 over which the arm 132 is inserted to secure the mounting arm 132 to the clamp 64. The mounting arms 132 are attached to the support frame members 30 and 32 in a manner identical to how the bicycle support arms 34 of FIG. 1 are attached. The mounting arms are pivotally attached to support frame member 30 adjacent the vehicle and rotatably attached to support frame member 32 distal from the vehicle. This arrangement insures that when the support frame members are pivoted, the mounting arms 132, and the rest of the ski rack 120 will remain in the same orientation with respect to the ground surface.

The mounting arms 132 are mounted to the main frame vertical beams 134 by hinge assemblies 188. The hinge assemblies 188 are welded or otherwise secured to the vertical beams 134 at an appropriate location between the support frame 126 and the locking frame 130 such that when the frame members 30 and 32 are locked against the vehicle the skis 122 are spaced well above ground level, and when the frame members 30 and 32 are pivoted downwards, the support frame 126 is at waist level to facilitate placement and removal of the skis. The hinge assembly 188 is arranged so that the mounting arms can be folded inwardly on each other when the ski rack 120 is not in use.

The ski rack 120 is also provided with a lockable plastic-coated cable 194 to prevent theft. One end of the cable 194 is looped around one of the main frame vertical beams 134 and the second end is wrapped around one of the support frame members 30 or 32 to prevent removal of the rack. In alternative embodiments of the invention, the second end of the cable may be passed through an opening in the cross-bolt 42 that holds the support rack 10 to the vehicle 12. In these embodiments, the support rack 10 could not be removed from the vehicle without first unlocking the cable 194.

The support rack 10 is used for transporting skis by substituting the ski rack 120 for the arms 34. The threaded fasteners 61 and 65 that hold the arms 34 or the ski rack mounting arms 132 are simply unscrewed and refastened to effect the substitution. Skis 122 are held by their toe clips in the support frame 126. The locking frame 130 prevents the skis from swaying when they are being transported. The skis 122 are in the up position away from the roadway when they are being transported and are pivoted downwards for placement in and removal from the rack. Thus, the skis 122 will not be damaged by rocks and pebbles that are thrown upward by the vehicle 12 and are easily accessible when their placement and removal from the ski rack 120 is desired. The ski rack 120 is shifted from the placement/removal position to the transport position in a manner identical to how the bicycle support arms 34 are moved as described with reference to FIG. 6. The ski rack 120, like the bicycle support arms 34, maintains its orientation to the ground surface when shifted between the placement/removal and transport positions.

The hinge assemblies 140, 172 and 188, that respectively connect the support frame 126, the locking frame 130 and the mounting arms 132 to the main frame, allow the ski rack 120 to be folded flat when it is not in use, as depicted in FIG. 8. This facilitates storage of the ski rack 120 in a minimal amount of space. The lock 160 and the locking cable 194 and the locking members 192 prevent the unauthorized removal of the skis or the ski rack 120.

Figure 9:
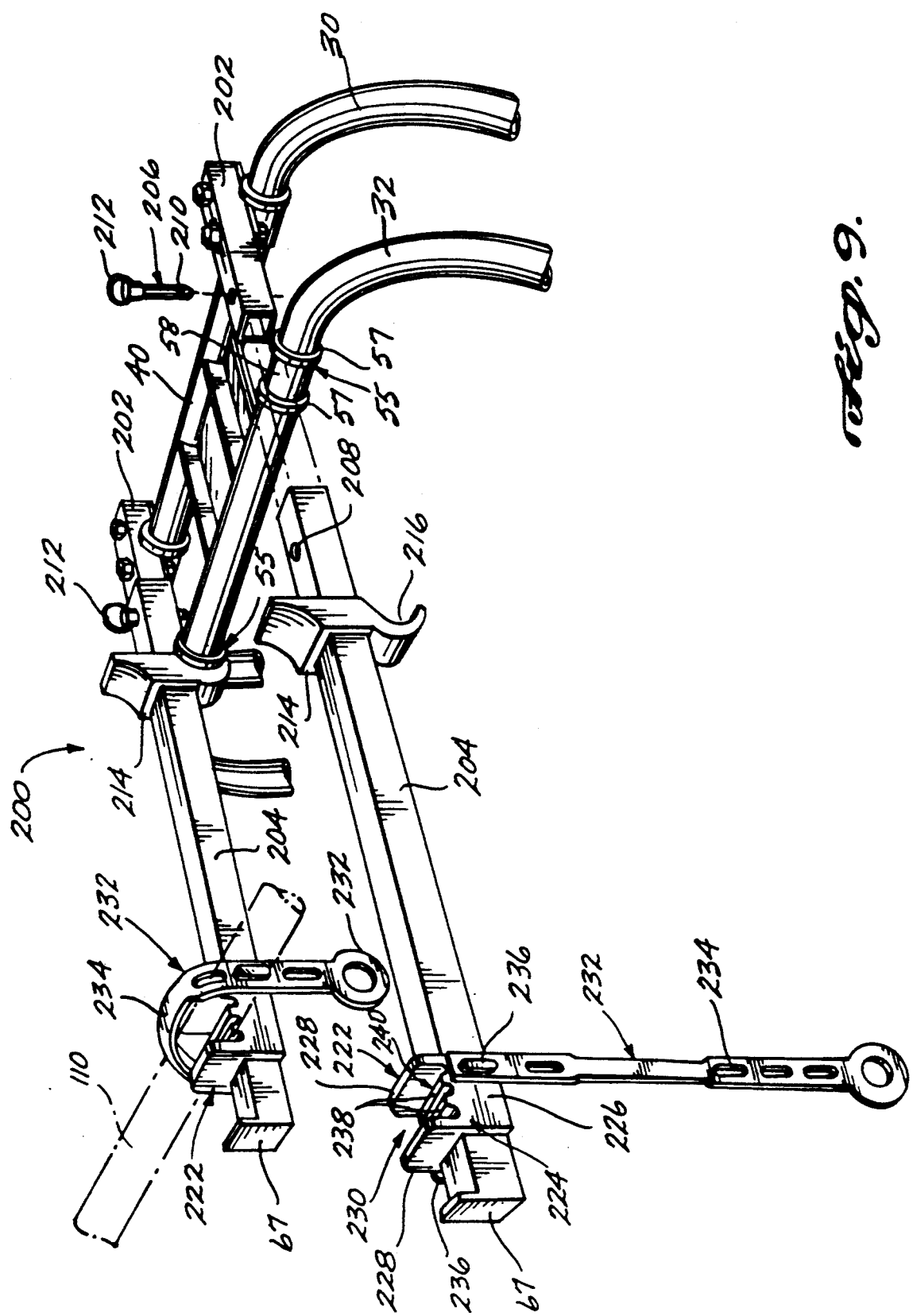
FIG. 9 is a perspective view of a releasable mounting arm system of an alternative embodiment of this invention showing the releasable arms both connected to and disconnected from the support rack of this invention and the bicycle support arms in both the attached and disconnected states.

Alternatively, in still other embodiments of the invention the bicycle support arms on the ski rack may be mounted to the frame members 30 and 32 using the attachment assembly 200 depicted in FIG. 9. The assembly 200 includes attached mounting arms 202 and releasable mounting arms 204 that substitute for the bicycle support arms 34 (FIG. 1) or ski rack mounting arms 132 (FIG. 7). Each attached mounting arm 202 is pivotally secured to a crossmember bushing 55 coupled over a first frame member 30 top rail 54. Each releasable mounting arm 204 is dimensioned to be coupled over the free end of an attached mounting arm 202.

The attached mounting arm 202 and releasable mounting arm 204 are selectively secured together by a detent pin 206 that is inserted through concentric openings 208 formed in each pair of interlocking arms. The tip of each detent pin 206 is provided with a biased bearing 210 that locks the pin in place. The opposite ends of the pins 206 are provided with a pull ring 212 to facilitate their installation and removal.

When the arms 202 and 204 are secured together, the releasable mounting arms 204 are seated in the saddles 58 of the bushings 55 located around the second frame member 32. A fastener member 214 mounted over each releasable mounting arm 204 holds each arm 204 in place. Each fastening member 214 is formed of reinforced plastic and is secured to the associated releasable mounting arm 204 by an appropriate fastener. Each fastening member 214 includes a hook 216 positioned to abut the associated second frame member bushing 55 below the releasable mounting arm 204. The hook 216 thus prevents vertical movement of the releasable mounting arm 204 as could otherwise happen when the vehicle 12 is in motion. Horizontal shifting of the releasable mounting arm is restricted by the hook 214 and the bushing lips 57 that define the saddles 58.

Each fastening member 214 is further provided with a stop 218 that extends upwards opposite the hook 216. The stop 218 restricts movement of bicycles towards the frame members when the releasable mounting rains 204 are used to support the bicycles.

Attachment assembly 200 provides a quick means for configuring the support rack 10 between the bicycle carrying and ski carrying modes. Different sets of releasable mounting arms 204 are designed to serve as bicycle support arms 34 or ski rack mounting arms 132. The depicted mounting arms 204 are designed to function as bicycle support arms and are dimensioned to support one or more bicycles thereon. The free ends of these mounting arms 204 are provided with stop plates 67 to block rearward movements of bicycles. Releasable mounting arms that function as ski rack mounting arms are attached to the ski rack main frame 124 (FIG. 7) in a manner identical to the attachment of the ski rack mounting arms 132 of the described ski rack.

The different sets of releasable 1mounting arms 204 can readily be interchanged by: removing the detent pins 206; pulling the first set of arms 204 away from the fixed mounting arms 202, coupling the new mounting arms in place over the fixed mounting arms; and, reinserting the detent pins. Attachment assembly 200 thus allows for quick reconfiguration of the support rack 10 without having to loosen and resecure threaded fasteners or other difficult to work with fastening means.

Also illustrated in FIG. 9 are a pair of mounting saddles 222 that are used to secure a bicycle 110, shown partially in phantom, to the support rack. Each mounting saddle 222 is formed out a single section of hardened rubber or reinforced plastic and is attached to a support arm 204. Each mounting saddle 222 has a base section 224 positioned on top of the associated arm. A pair of opposed flanges 226 extend downwards from the base section 224 along the side of the arms 202 and 204, and are dimensioned to secure the saddle to the mounting arm by a friction fit. A pair of opposed flanges 228 extend upwards from the base 224 across the mounting arm and project upwards to define a seating space 230 in which the top tube of the bicycle 110 is disposed.

The bicycle 110 is held in the mounting saddles 222 by elastic straps 232 that are attached to the saddles. Each strap 232 is provided with a number of elongated openings 234 so that the strap can be secured to complementary cleats 236 formed integrally with the mounting saddles 222. Each saddle base 224 is formed with a pair of spaced apart elongated ridges 238 that extend into and across the seating spaces 230. Each ridge 238 has an inwardly beveled top surface 240 on which the bicycle 110 top tube rests. The opposed ridge top surfaces 240 define a cradle that limits the sway of the bicycle 110.

An alternative tongue portion 250 integral with the base member 28 (FIG. 2) for securing the articulated support rack 10 to a trailer hitch sleeve 20 is depicted in FIGS. 10 and 11. The tongue portion 250 has the same generally rectangular shape as the previously described tongue portion 41 and is similarly dimensioned to be received inside the complementary trailer hitch sleeve 20. The tongue portion 250 is formed with a set of laterally extended openings 251 adapted to receive a pair of threaded fasteners 252 and 253 respectively for securing the articulated support rack 10 to the trailer hitch sleeve 20. A nut bar 254 is welded or otherwise secured into the tongue portion 250 adjacent the openings 251 on the side of the tongue portion. The nut bar is formed with threaded openings 255 adjacent to and concentric with the tongue portion openings 251 for securing the threaded fasteners 252 and 253.

The support rack 10 is secured to the trailer hitch sleeve 20 by a lock assembly 256 that prevents unauthorized removal of threaded fastener 252. The lock assembly 256 includes a lock body 257 formed with an opening 258 in which the head 259 of the threaded fastener 252 is seated. A tumbler 260 is secured in a second opening 261 formed in the lock body. The tumbler 260 has a rotating tongue 262 that turns with the actuation of a key 268 associated with the tumbler. The tumbler tongue 262 is disposed in a passageway 264 formed in the lock body 257 that extends between the first and second openings 258 and 261, respectively. The tumbler tongue 262 is dimensioned so that when in the locked position, it will extend into an annular groove 263 formed in the head 259 of the threaded fastener 252 and is spaced away from the cylindrical portion of the fastener that forms the base of the groove. A molded plastic cap 269 is disposed over the lock body adjacent the first opening 258. A lock ring 265 is press fitted over an annular extension 266 of the cap 269 that extends around the lock body first opening 258. The lock ring 265 is disposed around hexagonal base portion 267 of the threaded fastener head 259.

When support rack 10 with tongue portion 250 is mounted to a vehicle, the tongue portion is inserted into the trailer hitch sleeve 20. Threaded fasteners 252 and 253 are then inserted in the openings 251 and 255 where they are secured in place by the complementary threading on the nut bar openings 255. The lock assembly 256 is then secured over the head 259 of threaded fastener 252. The lock ring 265 prevents unauthorized persons from being able to place a wrench or other tool around the base portion 267 of the threaded fastener 252 so as to be able to remove the fastener from the rack tongue and trailer hitch openings 251 and 255, respectively. Moreover, threaded fastener 252 cannot be removed from the openings 251 and 255 by simply turning the lock assembly; since the tumbler tongue 262 is does not abut the cylindrical surface forming the base of the fastener head groove 263, turning the lock assembly does not force the fastener 252 to similarly rotate. An advantage of this tongue portion 250 is that it eliminates the need for having to provide separate complementary fasteners in order to hold the threaded fasteners 252 and 253 in place. Still another advantage of this assembly is that lock assembly 256 functions as a one-piece unit that prevents the unauthorized removal of the articulated support rack 10 of this invention from a vehicle.

Figure 13:
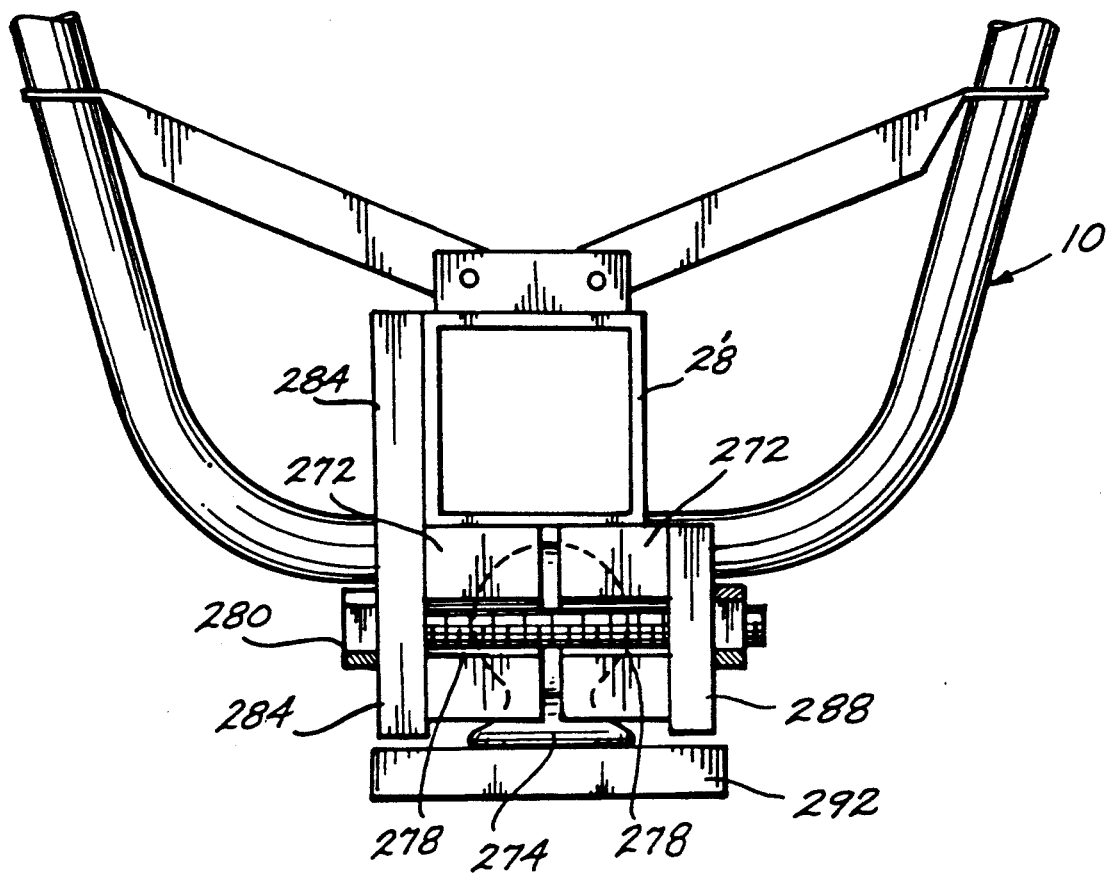
FIG. 13 is a cross sectional view of how the coupling assembly of FIG. 12 secures the support rack to a vehicle.

A coupling system 270 for attaching the articulated support rack to a ball-type trailer hitch 271 is depicted in FIGS. 12 and 13. The coupling system 270 includes a pair of ball blocks 272 shaped to be secured over a trailer hitch ball 274. Each ball block 272 is formed with a semi-spherical indentation 276 for fitting the block against the trailer hitch ball 274. Each block 272 is also formed with a semi-cylindrical grooves 278 that is dimensioned to partially receive threaded fasteners 280. A semi-circular opening 282 is further formed in the top of each block 272 to facilitate its removal from the trailer hitch ball 274.

Coupling system 270 further includes a ball attachment plate 284 welded or otherwise secured to a forward extension 286 of the articulated support rack base member 28. The ball attachment plate 284 extends downward from the rack base member 28. A clamping plate 288 is located below the support rack 10 opposed to the downward extending section of the ball attachment plate 284. The ball attachment plate 284 and the clamping plate 288 are both formed with openings 290 so that the threaded fasteners 280 can be fitted therethrough. Both the ball attachment plate 284 and the clamping plate 288 are dimensioned to abut the trail hitch tongue 292 on which the trailer hitch ball 274 is mounted.

An articulated support rack 10 with coupling system 270 is attached to a trailer hitch 271 by first fitting the ball blocks 272 over the trailer hitch ball 274. The rack 10 and the clamping plate 288 are then mounted against the ball blocks 272 so that the ball attachment plate 284 and the clamping plate are on opposite lateral sides of the ball blocks. The threaded fasteners 280 are then secured by nuts 281 in place so that the coupling system 270 is compression secured by the ball blocks 272 to the trailer hitch ball 274. The bottom edges of the ball attachment plate 284 and the clamping plate 288 abut the trailer hitch tongue 292 so as to provide vertical stability for the coupling system 270 and the support rack 10.

Alternative versions of the coupling system 270 are also possible. For example, the ball attachment plate 284 can be releasably secured to the rack base member 28 by using the threaded fasteners 252 and nut bar 254 described with respect to FIG. 10. Moreover, it may also be desirable to secure the clamping plate 288 to the rack base member 28. If the clamping plate 288 is so attached, it is desirable to use a hinge or other flexible means to secure the plate to the base member 28 in order to allow ball blocks 272 to maintain a compression fit around the trailer hitch ball 274. An advantage of attaching the clamping plate 288 to the base member 28 is that it minimizes the number of loose system components. The number of separate system components can also be minimized by welding or otherwise securing the ball blocks 272 to the ball attachment plate 284 and the clamping plate 288.

Figure 14:
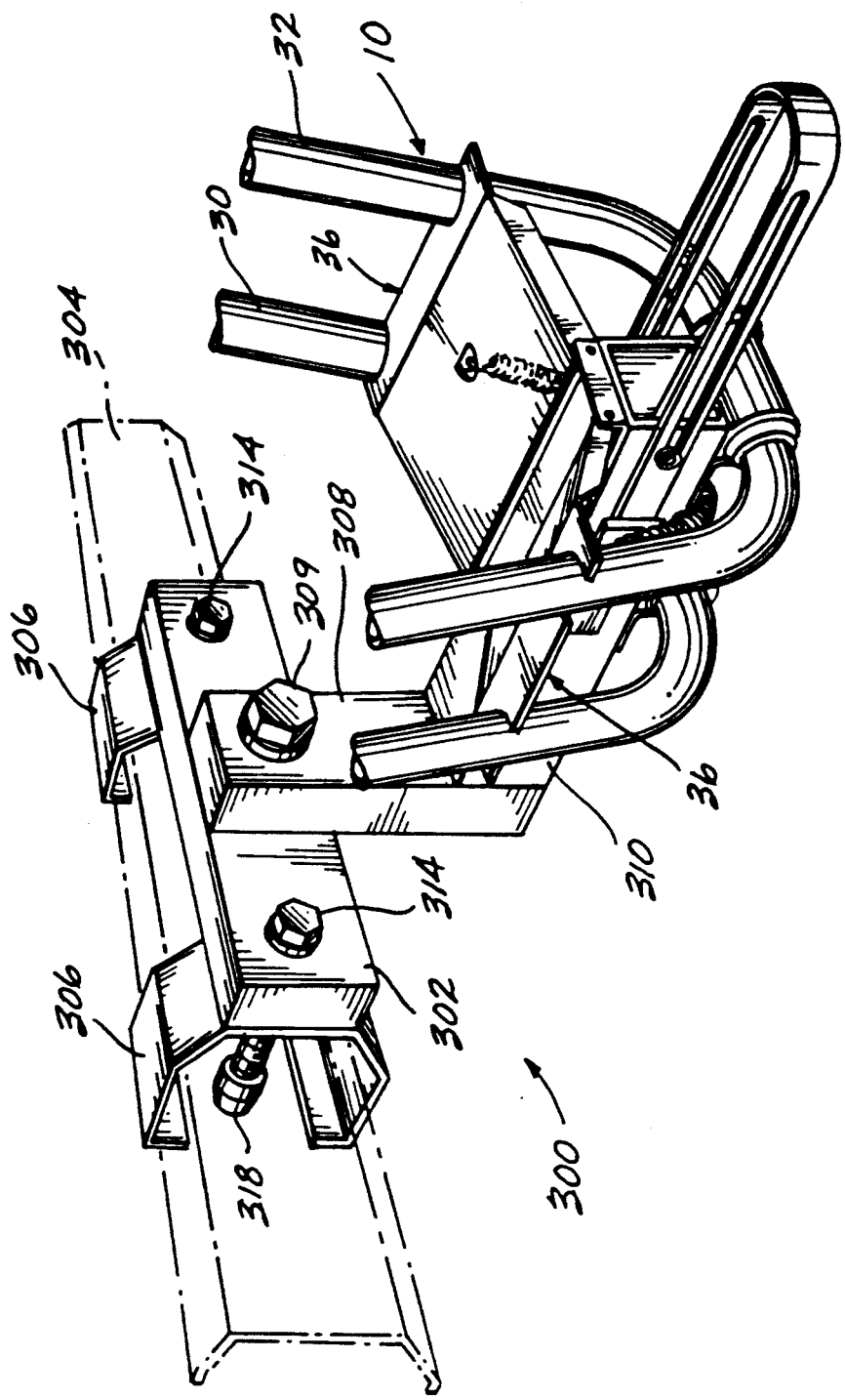
FIG. 14 is a perspective view of the bottom portion of the articulated support rack of this invention including a cross beam for mounting the rack to an automobile bumper.
Figure 15:
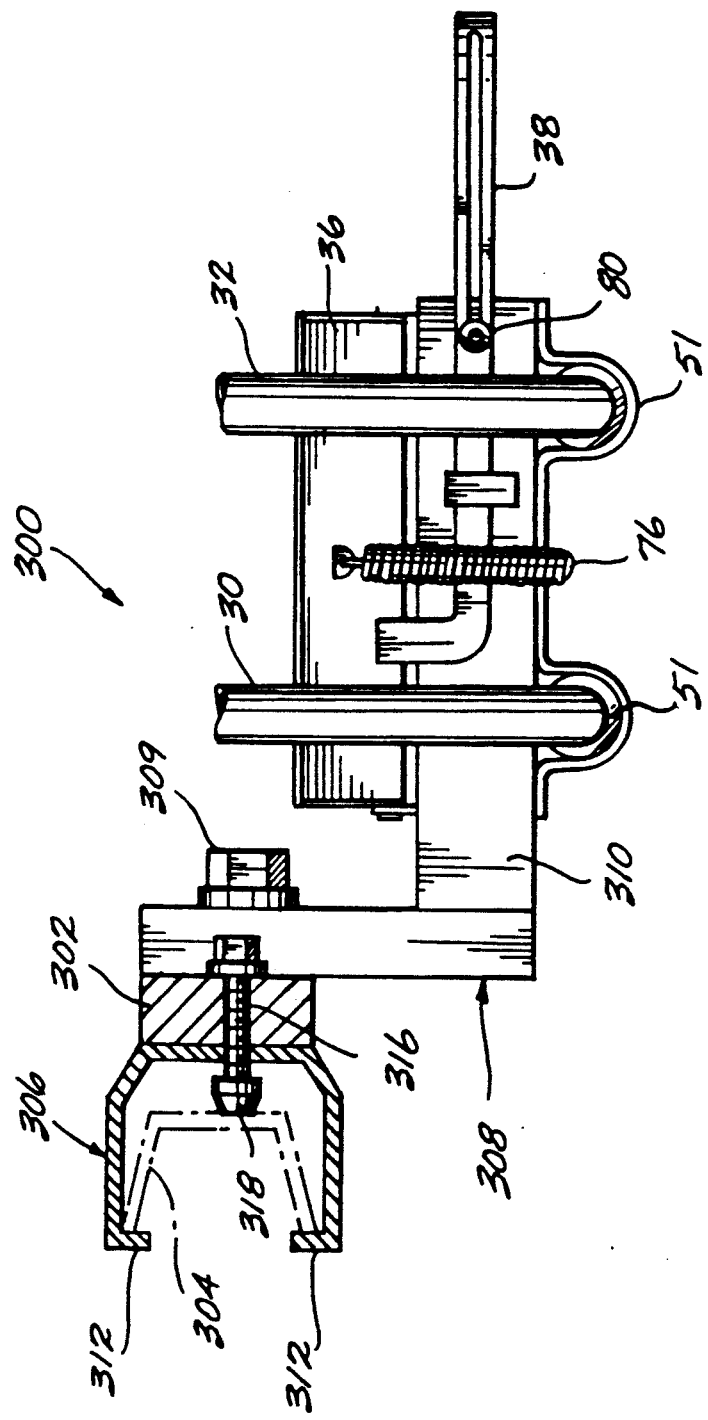
FIG. 15 is a cross sectional view of the bumper mounting assembly of FIG. 14.

FIGS. 14 and 15 illustrate a cross beam assembly 300 used to mount the articulated support rack of this invention to a vehicle that is not equipped with a trailer hitch sleeve. The cross beam assembly 300 includes a cross beam 302 that is releasably mounted to the vehicle bumper 304, shown in phantom by a pair of C-clamps 306. The cross beam 302 is secured to the C-clamps 306 by welding or other permanent means. An L-beam 308 is attached to the center of the cross beam 302 and extends downward from the cross beam. In the depicted embodiment of the invention, the L-beam 308 is secured to the cross beam 302 by a threaded fastener 309. The L-beam 308 has a bottom located horizontal extension 310 that is substantially identical to the base member of the articulated support rack described with respect to FIGS. 1 and 2. Articulate support frame members 30 and 32 are attached to the L-beam member horizontal extension 310 in a manner identical to that previously disclosed. The articulated support frame members are held in place by the same releasable lock plates 36 and associated securing and release assembly that were disclosed with respect to the previously-described embodiment of the invention.

As depicted in FIG. 15, the C-clamps 306 are dimensioned to fit loosely around the bumper 304. The ends of each C-clamp 306 are provided with a pair of inwardly directed flanges 312 that face each other. Bolts 314 extend through complementary threaded bores 316 formed in the cross beam 302 and the C-clamps 306 and abut the adjusts surface of the bumper 302. The ends of each bolt 314 are provided with a cap 318 formed of rubber, plastic or other material that will not mark or scratch the bumper 304. When the cross beam assembly 300 is used to secure the support rack to the vehicle, the C-clamps 306 are secured in place by the flanges 312 and the bolts 314. The articulated support rack can be removed from the vehicle by loosening the bolts 3 14 so that the C-clamps 306 can be worked free of the bumper 304.

While a preferred embodiment of the invention has been described in the context of loading and unloading a bicycle on a van, it is to be understood that the present invention will have other applications, such as on campers, or with the loading and unloading of minibikes, motorcycles, and the like. Furthermore, it is contemplated that various changes may be made therein without departing from the spirit and scope of the invention. For instance, a cable may be used to lift the lock plates 36 out of engagement with the first and second frame members 30 and 32. Moreover, alternative embodiments of the ski rack 120 are, of course, possible. For example, it may be desirable to provide the support frame 126 and the locking frame 130 with clamps or other fastening means so that ski poles can be mounted to the rack for transport. The support arms 142 may be provided with clamps having rubber flanges or other means for securing the skis so that the skis are not suspended by their toe clips. Consequently, the invention can be practiced otherwise than as specifically described herein.

The embodiments of the invention in which an exclusive property or privilege is claimed are defined as follows:

1. A ski rack assembly for mounting to an articulated support assembly attached to a vehicle, said ski rack assembly comprising:

a ski rack frame, said rack frame including two vertically oriented parallel beams and a cross beam connected between said vertical beams adjacent the top of said vertical beams;

a support frame said support frame including a first cross beam connected to said rack frame and at least one pair of open-ended support arms connected to said support frame first cross beam, said support arms being spaced apart so that at least one ski may be secured therebetween, wherein said support frame first cross beam is hingedly connected to said rack frame cross beam so that said support arms may be selectively moved between a first position extending perpendicularly away from said rack frame and a second position approximately parallel to and overlapping said rack frame; and two mounting arms, each said mounting arm attached to a separate one of said rack frame vertical beams and adapted for connection to the articulated support assembly, wherein said mounting arms are hingedly attached to said vertical beams to move between a first extended position extending perpendicularly away from said vertical beams and a second collapsed position wherein said mounting arms are approximately substantially parallel to the vertical plane which contains said vertical beams.

2. The ski rack assembly of claim 1 wherein said support frame further includes a plurality of pairs of support arms, said support arms being dimensioned so that at least two skis can be supported between each of said pair of arms, said support arms being arranged linearly along said support frame first cross beam; and a second cross beam being pivotally connected at one end at the open end of said support arm secured at one end of said support frame first cross beam, releasably secured at the open end of said support arm secured at a second end of said support frame, and positioned over the open ends of said remaining support arms to prevent the removal of the skis.

3. The ski rack assembly of claim 2, further including a locking frame comprising a cross beam mounted across said rack frame vertical beams below said support frame, a plurality of tail frames attached to said locking frame cross beam, each said tail frame defining at least one tail opening and located in line with a pair of ski rack support frame support arms so that ski tails can be located in said one tail opening wherein, said locking frame cross beam is hingedly secured to said vertically oriented beams so as to move between a first position extending perpendicularly away from said vertically oriented beams and a second position approximately parallel to and overlapping said rack frame vertical beams.

4. The ski rack assembly of claim 3 wherein said mounting arms are adapted to be releasably attached to fixed arms secured to the articulated support assembly.

5. The ski rack assembly of claim 3, wherein said support frame first cross beam is hingedly secured to said rack frame so that when said support frame is in said first extended position, said support frame first cross beam is disposed over said rack frame vertical beams and said rack frame cross beam.

6. The ski rack assembly of claim 1, wherein said support frame first cross beam is hingedly secured to said rack frame so that when said support frame is in said first extended position, said support frame first cross beam is disposed over said rack frame vertical beams and said rack frame cross beam.

7. The ski rack assembly of claim 3, wherein said mounting arms are attached to said rack frame vertical beams so that when said mounting arms are approximately parallel to the vertical plane which contains said vertical beams, said mounting arms are directed toward each other.

8. A collapsible ski rack assembly configured for attachment to a vehicle support frame comprising:
   a vertically oriented main frame;
   a support frame attached to said main frame, said support frame including: a plurality of pairs of open ended support arms, each said pair of support arms being spaced so that two skis can be suspended between said pair of support arms; and a locking arm pivotally connected at one end to a first support arm located at one end of said support frame, releasably secured to a second support arm located at a second end of said support frame, and positioned over the open ends of said other support arms to prevent the removal of the skis;
   a locking frame connected to said main frame below said support frame said locking frame including a plurality of tail frames each of said tail frames defining a tail opening that is vertically aligned with a respective pair of said support arms so that tail ends of the skis can be located in said tail openings; and
   at least one mounting arm attached to said main frame adapted for connection to the vehicle support assembly;
   wherein said support frame, said locking frame, and said at least one mounting arm are hingedly attached to said main frame to move between a first position extending perpendicularly away from said main frame and a second, collapsed position approximately parallel to and overlapping with said main frame, said support frame and said locking frame being attached to said main frame to extend in a first direction away from said main frame and said at least one mounting arm being attached to said main frame to extend in a second direction opposite said first direction away from said main frame.

9. The ski rack of Claim 8, wherein: said main frame includes at least two vertical beams and a cross beam connected between the top of said vertical beams; said support frame includes a cross beam to which said support arms are attached wherein, said support frame cross beam is hingedly connected to said main frame so that when said support frame is in said extended position, said support frame cross beam is located on top of said main frame vertical beams and said main frame cross beam.

10. The ski rack of claim 9, further including two mounting arms, wherein each said mounting arm is connected to a respective one of said main frame vertical beams and said mounting arms are connected to said main frame vertical beams so that when said mounting arms are in said second, collapsed position, said mounting arms are directed toward each other.

11. The ski rack of claim 8, further including two mounting arms, wherein each said mounting arm is connected to a respective one of said main frame vertical beams and said mounting arms are connected to said main frame vertical beams so that when said mounting arms are in said second, collapsed position, said mounting arms are directed toward each other.

* * * * *

UNITED STATES PATENT AND TRADEMARK OFFICE
CERTIFICATE OF CORRECTION

PATENT NO. : 5,330,312
DATED : July 19, 1994
INVENTOR(S) : I.J. Allsop

It is certified that error appears in the above-indentified patent and that said Letters Patent is hereby corrected as shown below:

| COLUMN | LINE | |
|---|---|---|
| 3 | 29 | "frown" should read --from-- |
| 3 | 52 | "stone" should read --same-- |
| 4 | 12 | "position" should read --invention-- |
| 5 | 37 | "from" should read --formed-- |
| 6 | 2 | "of" (first occurrence) should be deleted |
| 7 | 43 | "12 I-" should read --12-- |
| 8 | 19 | "inverted-unshaped" should read --inverted U-shaped-- |
| 9 | 5 | "a, cross section" should read --a cross section-- |
| 10 | 67 | "rains" should read --arms-- |
| 11 | 15 | "1mounting" should read --mounting-- |
| 11 | 27 | "out a" should read --out of a-- |
| 12 | 35 | "is does not" should read --does not-- |
| 13 | 63 | "adjusts" should read --adjacent-- |
| 14 | 2 | "bolts 3 14" should read --bolts 314-- |

UNITED STATES PATENT AND TRADEMARK OFFICE
CERTIFICATE OF CORRECTION

PATENT NO. : 5,330,312
DATED : July 19, 1994
INVENTOR(S) : I.J. Allsop

It is certified that error appears in the above-indentified patent and that said Letters Patent is hereby corrected as shown below:

| COLUMN | LINE | |
|---|---|---|
| 14 (Claim 1) | 36 | "frame said" should read --frame, said-- |
| 16 (Claim 8) | 4 | "frame said" should read --frame, said-- |
| 16 (Claim 8) | 5 | "frames each" should read --frames, each-- |

Signed and Sealed this

Sixth Day of December, 1994

Attest:

BRUCE LEHMAN

*Attesting Officer*     *Commissioner of Patents and Trademarks*